United States Patent [19]

Nemoto et al.

[11] Patent Number: 5,063,650

[45] Date of Patent: Nov. 12, 1991

[54] METHOD OF SERRATION-FITTING ASSEMBLING STEERING ASSEMBLY

[75] Inventors: Kenji Nemoto; Kuninobu Uchida; Keiichiro Gunji; Nagatoshi Murata; Iwao Maruyama, all of Sayama, Japan

[73] Assignee: Honda Giken Kogyo Kabushiki Kaisha, Tokyo, Japan

[21] Appl. No.: 538,063

[22] Filed: Jun. 13, 1990

[30] Foreign Application Priority Data

Jun. 17, 1989 [JP] Japan ................................. 1-155547

[51] Int. Cl.⁵ .......................... B23Q 17/00; B62D 1/18
[52] U.S. Cl. ........................................ 29/407; 29/469; 29/705; 74/473 SW
[58] Field of Search ................. 29/404, 407, 434, 469, 29/705; 74/473 SW, 493; 180/140; 280/91; 403/334; 409/244

[56] References Cited

U.S. PATENT DOCUMENTS

| | | |
|---|---|---|
| 4,752,078 | 6/1988 | Ogura et al. ........................ 280/91 |
| 4,805,286 | 2/1989 | Uchida et al. ..................... 29/404 X |
| 4,872,793 | 10/1989 | Ogawa ................................. 409/244 |
| 4,955,935 | 9/1990 | Katayama ....................... 74/473 SW |

FOREIGN PATENT DOCUMENTS

0292442 11/1988 European Pat. Off. .
64-28537 1/1989 Japan .
57-201779 9/1990 Japan .

Primary Examiner—Joseph M. Gorski
Assistant Examiner—Peter Dungba Vo
Attorney, Agent, or Firm—Armstrong, Nikaido, Marmelstein, Kubovcik & Murray

[57] ABSTRACT

A method of assembling a steering assembly having a socket connected to a steering shaft via a steering joint which socket is to be serration-fitted to an input shaft of a gearbox which is mounted on a suspension assembly. The phase of the socket is measured at the time when a steering wheel is aligned in a neutral posture while the steering assembly is maintained in the same articulated condition as when the steering assembly is assembled to a car body and while the steering wheel is serration-fitted to the steering shaft of the steering assembly. The phase of the input shaft is adjusted such that the input shaft can be serration-fitted into the socket in the phase measured in the preceding step. The adjustment is performed by rotating the input shaft within an angular range corresponding to one half pitch of the serrations of the input shaft in either direction from a neutral posture in which the steering angles to the right and to the left are equal. The alignment of the right and the left wheels is adjusted to a condition where the car can run straight while the input shaft is maintained in the adjusted phase. A guide member which determines the phase of the socket relative to the input shaft is engaged with the input shaft in such a phase relationship that the socket becomes substantially equal in phase to the measured phase when the input shaft is in the adjusted phase. The socket of the steering assembly is serration-fitted to the input shaft of the suspension assembly by guiding the socket with the guide member.

2 Claims, 7 Drawing Sheets

METHOD OF SERRATION-FITTING ASSEMBLING STEERING ASSEMBLY

This invention relates to a method of assembling a steering assembly having a socket connected to a steering shaft via a steering joint which socket is to be serration-fitted to an input shaft of a gearbox mounted on a suspension assembly. More particularly, the present invention relates to a method of assembling a steering assembly to a car body by preadjusting the assembly such that the steering wheel is exactly in a neutral posture after assembly when the right and the left wheels are in a condition in which the car can run straight (hereinafter referred to as a "straight-running condition").

There is known, from the Japanese Patent Application No. 183445/Showa 62 (1987) filed by the same assignee, a method of adjusting a steering system during assembly such that a steering wheel is in a neutral posture when a car is in a straight-running condition. In this method, before the steering assembly is assembled to the car body, the steering wheel is fitted by means of serrations (hereinafter referred to as "serration-fitting") to a steering shaft of the steering assembly. The phase of a socket of the assembly is measured when the steering wheel is aligned in the neutral posture. On the basis of this measurement, an input shaft of a steering gearbox is rotated within an angular range corresponding to one half pitch of the serrations of the input shaft in either direction from a neutral position in which the steering angles to the right and to the left are equal. The phase of the input shaft is adjusted so that the input shaft may be serration-fitted into the socket which is in the previously measured phase (that is, with the steering wheel in a neutral posture). In this condition, the alignment of each of the right and the left wheels is adjusted (hereinafter referred to as a "toe adjustment") such that the car is in a straight-running condition. After the measurement of the phase of the socket, the steering assembly is assembled to the car body with the steering wheel removed therefrom, and the socket is serration-fitted to the input shaft. When the steering wheel is mounted on the steering shaft at a stage of completion of the assembly of the car, the steering wheel is, first, temporarily mounted on the steering shaft and the right and the left wheels are steered into a straight-running condition. Thereafter, the steering wheel is taken off and re-mounted on the steering shaft after the steering wheel itself has been aligned in its neutral posture.

Normally, the serrations to be formed in the steering shaft and the serrations to be formed in the socket are formed with the same pitch. Even if the socket is not fitted onto the input shaft in a particular phase, when the right and the left wheels are turned to be in a straight-running condition, as a result of which the input shaft is in the same phase as the phase at the time of the toe adjustment, the phase of the serrations for fitting the steering wheel becomes the same when taken altogether; although the position of each tooth may be different from that at the time of the phase measurement of the socket. The steering wheel, therefore, should be able to be fitted to the steering shaft in the same manner as at the time of the phase measurement. That is the reason why in the conventional method as described above, the socket is made to be serration-fitted to the input shaft at an arbitrary phase at the time of assembling the steering shaft to the car body.

Actually, there are cases, however, where the steering wheel slightly deviates from its neutral posture at the time when the right and the left wheels are in a straight running condition.

An analysis by the inventors of this invention has revealed that the cause for this deviation is attributable to the inequality in velocity of the universal joints mounted at both ends of a steering joint which connects the socket and the steering shaft together.

If the socket is fitted to the input shaft of the steering gearbox at an arbitrary phase as mentioned above, when the input shaft has become the same phase as at the time of the toe adjustment, there is a possibility that the phase of the socket deviates from the phase at the time of the phase measurement by an integer n multiple of the pitch angle $\alpha$ of the serrations of the socket. If the angle $\Theta$ of deviation from the phase at the time of the phase measurement of the steering shaft becomes $n\alpha$, there is no problem. But, due to the inequality in velocity of the universal joints, the rotational angle of the steering shaft in a unit rotational angle of the socket varies during one rotation of the socket; $\Theta$ is not equal to $n\alpha$. The result is that the phase of the serrations for fitting the steering wheel is deviated by an angle $\beta = \Theta - n\alpha$ from the phase at the time of the phase measurement within an angular range corresponding to one pitch of the serrations, and that the steering wheel deviates by $\beta$ from the neutral posture.

Additionally, in the conventional steering wheel, the serrations formed in the boss bore into which the steering shaft is fitted are formed under no particular phase control for obtaining a predetermined phase or orientation. Consequently, the phase of the serrations varies from steering wheel to steering wheel and, therefore, it is necessary to combine the particular steering wheel that has been used in the phase measurement of the socket with a predetermined steering assembly. Here, since the steering wheel is a hindrance in assembling the steering assembly and other parts to the car body, it is normal practice to remove it from the steering assembly after the phase measurement and to re-assemble it to the steering assembly at the stage of completion of assembly of the car. The control of the combination of the particular steering wheel and the particular steering assembly is therefore troublesome.

An object of this invention is, in view of the above problems, to provide a method of assembling a steering wheel such that, when the right and the left wheels are in a straight-running condition, the steering wheel is accurately and automatically in a neutral posture. Another object of this invention is to provide a method of assembling in which the control of the particular combination of one steering wheel and the steering assembly is not necessary.

SUMMARY OF THE INVENTION

In order to attain the above-mentioned first object, in a method of assembling a steering assembly having a socket connected to a steering shaft via a steering joint which socket is to be serration-fitted to an input shaft of a gearbox which is mounted on a suspension assembly, the method comprises the steps of:

measuring a phase of the socket of the steering assembly at the time when a steering wheel is aligned in a neutral posture while the steering assembly is maintained in the same articulated condition as that in which the steering assembly is assembled to a car body and while the steering wheel is serration-fitted to the steering shaft of the steering assembly;

adjusting a phase of the input shaft such that the input shaft can be serration-fitted into the socket which is in the phase measured in the preceding step, the adjustment being performed by rotating the input shaft within an angular range corresponding to one half pitch of the serrations of the input shaft in either direction from a neutral posture in which the steering angles to the right and to the left are equal;

adjusting the alignment of the right and the left wheels to a condition in which the car can run straight while the input shaft is maintained in the adjusted phase:

engaging a guide member which determines the phase of the socket relative to the input shaft, with the input shaft in such a phase relationship that the socket becomes substantially equal in phase to the measured phase when the input shaft is in the adjusted phase;

assembling the suspension assembly and the steering assembly with the steering wheel detached therefrom to the car body; and serration-fitting the socket of the steering assembly to the input shaft of the suspension assembly by guiding the socket with the guide member.

According to another feature of this invention, in order to attain the second object, the method comprises the steps of:

forming serrations in a boss bore of each steering wheel which is to be serration-fitted to the steering shaft of each steering assembly, while controlling the phase thereof to become a predetermined phase; and in the above-mentioned step of measuring the phase of the socket, measuring the phase of the socket, while a steering wheel member comprising one of an arbitrary steering wheel and a steering wheel model is aligned in the neutral posture by fitting the wheel member onto the steering shaft, the steering wheel model having a boss bore formed therein with serrations of the same phase as that of the above-mentioned serrations of the steering wheel.

After having assembled the steering assembly according to the method of this invention, the steering wheel is temporarily mounted on the steering shaft to turn the right and the left wheels to be in a straight-running condition. In this condition, the steering wheel is remounted on the steering shaft after having been aligned to be in the neutral posture. Here, the input shaft becomes the same phase as at the time of the toe adjustment. On the other hand, the socket which has been serration-fitted to the input shaft after phase adjustment by means of the guide member becomes the same phase as at the time of the phase measurement. The steering shaft also becomes the same phase as at the time of the phase measurement. In this way, it is possible to accurately serration-fit the steering wheel to the steering shaft in the neutral posture.

In addition, since the serrations are formed in the boss bore of the steering wheel under careful phase control, there is no scatter in the phase of the serrations of the boss bore from steering wheel to steering wheel. Therefore, in a car assembled with a suspension assembly, if a steering assembly to be combined with that suspension assembly is assembled, whichever steering wheel may be mounted will be in the neutral posture in a straight-running condition.

It is, therefore, not necessary to feed a steering wheel on the assembly line in combination with a steering assembly, thereby resulting in a simplified work with quite a high efficiency. In addition, since the socket is guided by the guide member when the socket is serration-fitted into the input shaft, the fitting work within such a limited working space as under and in the engine compartment can be performed easily.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 3 (*a*) is a front view of a phase measuring device.

FIG. 3 (*b*) is a plan view thereof.

FIG. 3 (*c*) is a sectional view of an encoder.

FIG. 6 (*a*) is a plan view of a guide member.

FIG. 6 (*b*) is a front view thereof.

FIG. 6 (*c*) is a perspective view thereof.

FIG. 7 (*a*) is a vertical sectional view of a guide member feeding device.

FIG. 7 (*b*) is an enlarged vertical sectional view of a portion thereof.

FIG. 7 (*c*) is a bottom view thereof.

FIG. 8 (*a*) through (*d*) are views for explaining the guiding function of the guide member.

DETAILED DESCRIPTION OF A PREFERRED EMBODIMENT

Figure 1:
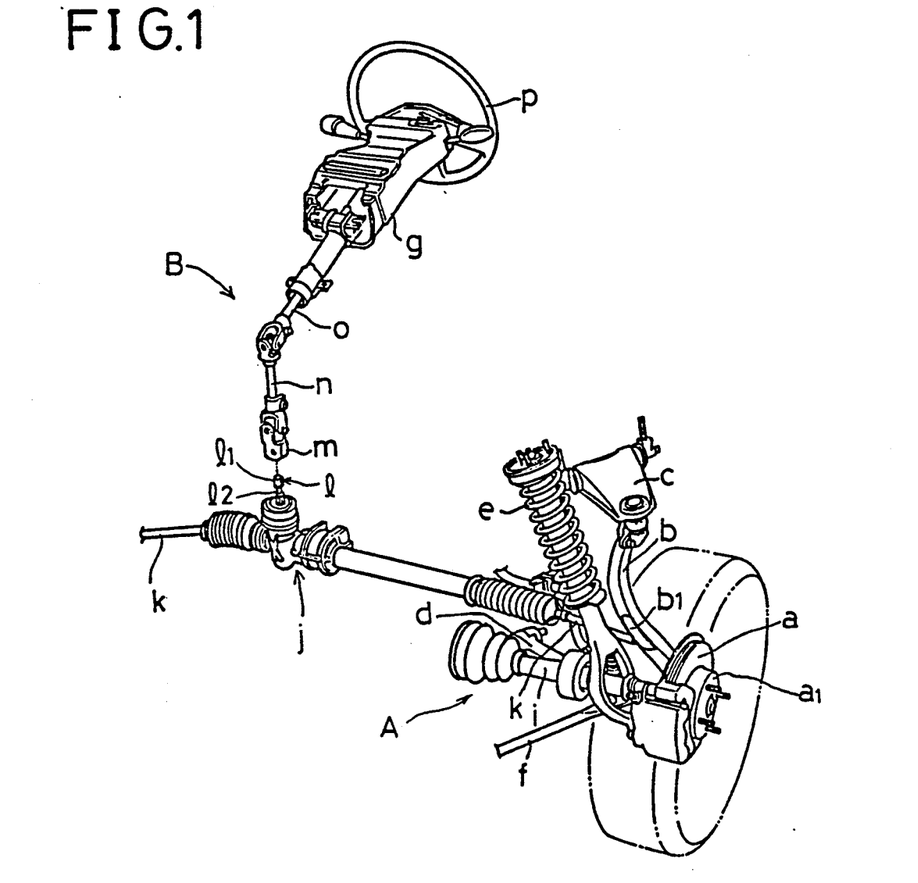
FIG. 1 is a perspective view of a suspension assembly and a steering assembly.

An embodiment of this invention is described hereinbelow with reference to the drawings. FIG. 1 is an arrangement of a steering system to which this invention is applied. In the figure, A is a wishbone-type suspension assembly for a front wheel, B is a steering assembly, a is a disk rotor, $a_1$ is a surface to which the wheel is attached, b is a knuckle arm, $b_1$ is a reference surface for setting the knuckle arm, c is an upper arm, d is a lower arm, e is a cushion unit, f is a radius rod, i is a drive shaft and j is a steering gearbox. A rack which serves as the output member of the steering gearbox j is connected to the knuckle arm b by means of a tie rod k. An input shaft 1 of the steering gearbox j has external serrations $1_1$, and an external ring groove $1_2$.

Figure 2:
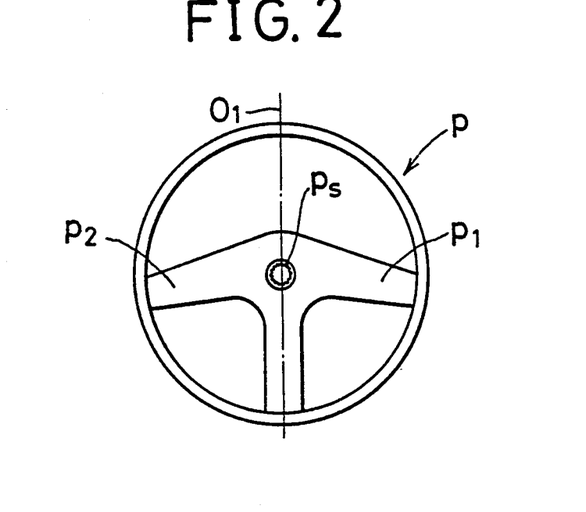
FIG. 2 is a front view of a steering wheel.

The steering assembly B comprises a socket m connected to a steering shaft o via a steering joint n which has a universal joint on each end thereof. In FIG. 1, the steering assembly B is shown with a column cover g and a steering wheel p mounted thereon. The steering wheel p must be connected to the steering shaft o, for aesthetic reasons and for the sake of convenience in use, in a neutral posture in which a pair of spokes $p_1$, $p_2$ provided on the steering wheel p (as shown in FIG. 2) are horizontally oriented and in which the projected line of the center line $o_1$, of the steering wheel p coincides with the longitudinal direction of the car when the right and the left wheels are arranged to be in a straight-running condition. One object of this invention is to enable the connection of the steering wheel to the steering shaft accurately and easily in such a neutral posture.

The steering wheel p has a boss bore with serrations ps for connection to the steering shaft o. The serrations ps are arranged such that they have the same phase in each steering wheel to be used. For example, it is arranged such that a bottom land of the serrations of every wheel is located in the upper portion of the serrations which crosses the center line $o_1$. The serrations os of the steering shaft o (see FIG. 3(a)) are fitted into the above serrations in the same phase.

Figure 4:
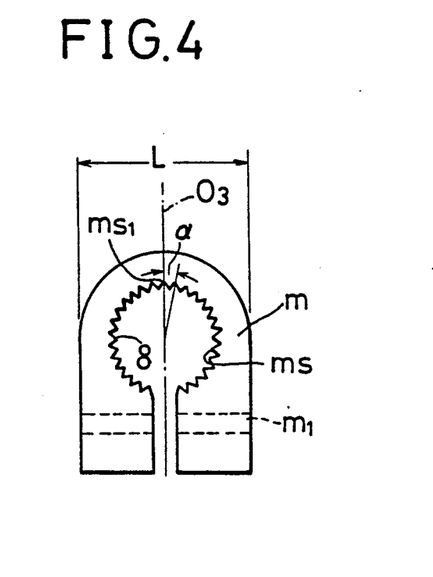
FIG. 4 is an end view of a socket.

On the other hand, a socket m on the other end of the steering shaft o has, as shown in FIG. 4, a U-shaped external shape and is provided with serrations ms of a pitch angle $\alpha$ (e.g., 12 degrees) and a tightening hole $m_1$. In the center line $o_3$ of the socket m there is located a bottom land, for example, of the serrations ms as shown in FIG. 4.

Figure 3A:
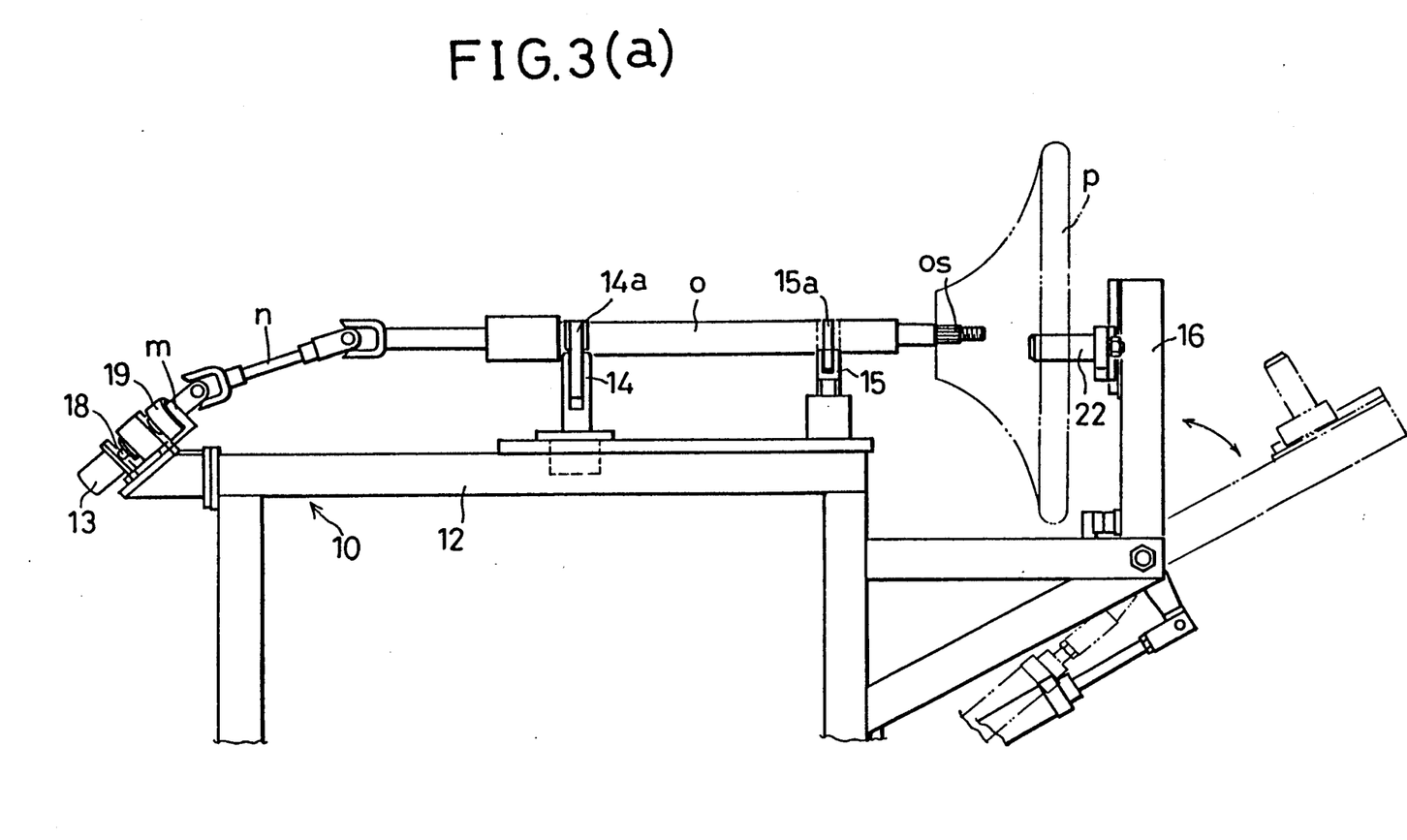
Figure 3B:
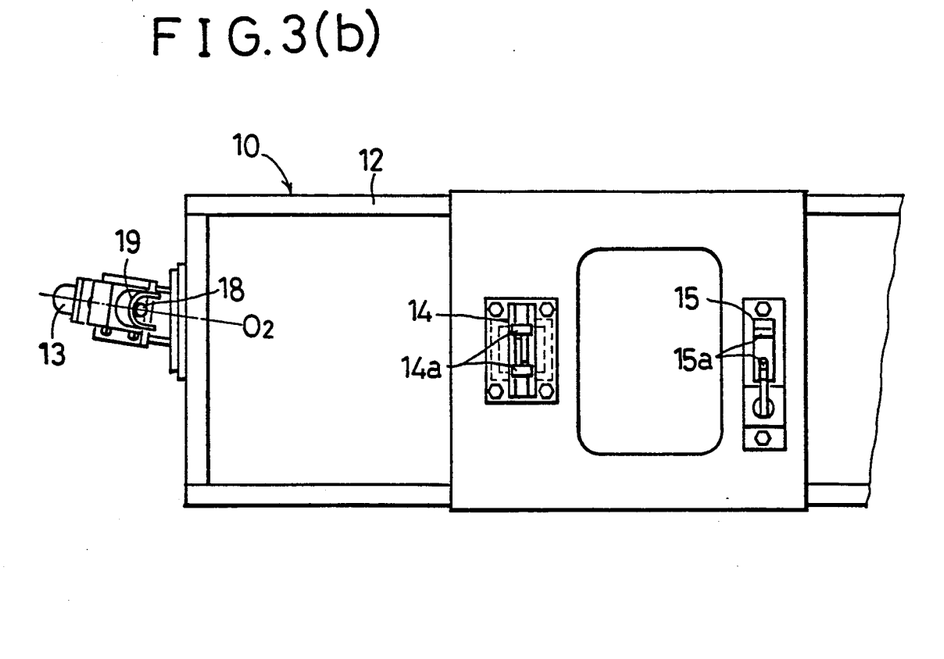
Figure 3C:
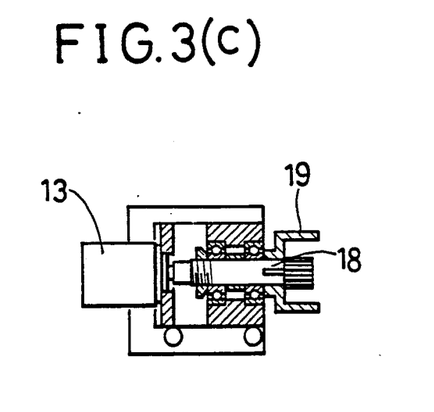

Before the steering assembly B is assembled to a car body, an arbitrary steering wheel p is serration-fitted at its boss bore to the steering shaft o of the assembly B. The phase of the socket m is detected by a phase measuring device 10, in the condition that the steering wheel p is held in the neutral posture as shown in FIGS. 3(a), 3(b), and 3(c). The detected phase is input into a steering positioning device 30 which is described hereinbelow.

The phase measuring device 10 includes a device frame 12, an encoder 13 mounted on one end of the frame 12, shaft holders 14, 15 on the frame 12, and a wheel clamper 16 which is hingedly mounted on the other end of the frame 12 to move between an erected position and a laidback position. The steering assembly B is held in the same articulated condition as when mounted on the car body and the steering wheel is held by the wheel clamper 16 in the neutral posture. Clampers 14a, 15a, are provided in each respective shaft holder 14, 15 to fix and hold the steering shaft o in one position.

A spindle 18 is connected to the encoder 13 and is serration-fitted to the socket m. A U-shaped guide 19 is integrally connected to the spindle 18. The external periphery of the socket m is fitted into the guide 19. In this manner the angle of rotation of the spindle 18 can be measured by the encoder 13. The spindle 18 is mounted substantially in the same direction as the input shaft 1 of the steering gearbox will be in the final assembly. The condition as shown in the figure is the neutral position, the condition being such that the center line of the guide 19 on which one of the tooth crests of the serrations of the spindle 18 is located coincides with a reference line $O_2$ which intersects the axis of the spindle 18 at right angles in a vertical plane which includes the axis of the spindle 18.

The wheel clamper 16 is provided with a pair of positioning pins 22. A steering wheel is mounted on the wheel clamper 16. The wheel clamper 16 is then moved to the erected position and the spokes $p_1$, $p_2$ are held fast by the pins 22 in order to position the steering wheel p in the neutral posture.

In measuring, the socket m is guided by the guide 19 for serration-fitting to the spindle 18 such that the tooth land $ms_1$, on the center line $O_3$ of the socket m coincides with that tooth crest of the spindle 18 which is positioned on the center line of the guide 19. Next, with the spindle 18 positioned in the neutral position, the steering wheel p is serration-fitted to the steering shaft o by visually confirming that the steering wheel p is in the neutral posture. Thereafter, the steering wheel p is aligned by the wheel clamper 16 to the neutral posture, and the phase of the socket m at this time is detected by the encoder 13 as an angle of rotation of the spindle 18 from the neutral position, i.e., as an angle of deviation of the tooth land $ms_1$, off the reference line $O_2$. The encoder 13 is provided with stoppers to limit the rotation of the spindle 18 from the neutral position within a range of $\pm 0.50\alpha$. When the stoppers are actuated (that is, more rotation than $\pm 0.50\alpha$ is needed), the steering wheel p is mounted again to perform measurement once again so that the phase of the socket m may be detected within the range of $\pm 0.50\alpha$ on the condition that the phase is zero when the tooth land $ms_1$ coincides with the reference line $O_2$. The steering wheel p is removed from the steering shaft after the measurement and is mounted again on the shaft o in a later process of assembling the steering assembly B to the car body. The phase of the socket m may also be measured by connecting a wheel model having a boss bore with the same serrations of the same phase as the serrations ps, to the steering shaft o, instead of using the steering wheel p itself.

Figure 5:
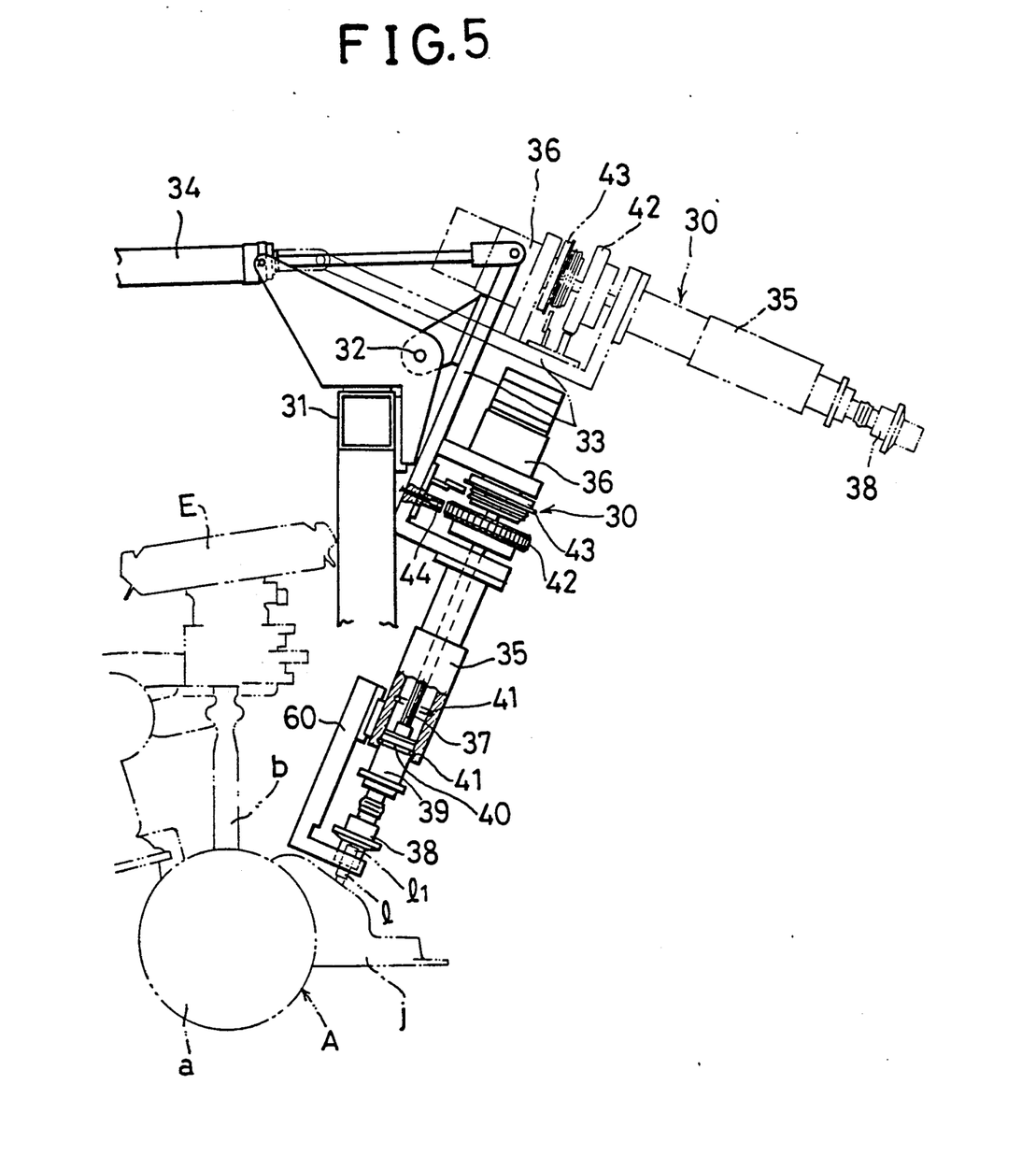
FIG. 5 is a side view of a steering positioning device.

The adjustment of the input shaft 1 of the steering gearbox j is made in the following manner. In FIG. 5, the suspension assembly A, an engine E, and the steering gearbox j are integrally assembled. The phase of the input shaft 1 is adjusted by the steering positioning device 30.

The steering positioning device 30 has a swingable frame 33 which is pivotally mounted on a device frame 31 by a hinge 32, and an actuating cylinder 34 which rotates the swingable frame 33. The swingable frame 33 is swung between a downward operating position and a lateral non-operating position. A guide sleeve 35 and an electric motor 36 are fixed to the swingable frame 33 so that a vertically movable shaft 37 may be rotatably driven by the electric motor 36. An adjusting socket 38 which is fitted to the serrations $1_1$ of the input shaft 1, and a stopper 39 are fixed at the end of the shaft 37. A ring groove 40 on the stopper 39 is engageable with an upper lock ring 41 and a lower lock ring 41 within the sleeve 35 so that the adjusting socket 38 may be resiliently engaged in an upper position and a lower position. The adjusting socket 38 is manually pulled down to the lower position to fit it to the input shaft 1. A gear 42 with teeth of the same number and same phase as serrations $1_1$ of the input shaft 1, and a torque limiter 43 are mounted at the upper end of the shaft 37. A detector 44 which comprises a proximity switch is mounted in a position of the frame 33 which faces the gear 42 so that the number of teeth which pass the detector 44 may be counted by a counter connected to the detector 44, thereby detecting the angle of rotation of the input shaft 1.

In making adjustments of the phase of the input shaft 1 with such a steering positioning device, the input shaft 1 is first rotated by the motor 36 to the extreme limit of one side and, on the basis of this, an angle of rotation is then measured by rotating the input shaft 1 to the extreme position of the other side. The neutral position is obtained by rotating the input shaft 1 back again by one half of the angle of rotation. The phase of the input shaft at this point is detected in the form of the phase difference from a reference phase in which any tooth crest of the serrations $1_1$ coincides with a reference line which corresponds to the reference line $O_2$. The input shaft 1 is rotated from the neutral position of the input shaft 1 to one direction or to the opposite direction by the amount of the phase difference between the above-mentioned phase and that phase of the socket m which has been detected by the phase measuring device 10.

According to the above method, the phase of the input shaft 1 becomes the phase in which the tooth crests of the serrations $1_1$ correspond to the tooth lands of the serrations ms of the socket m which is in the phase at the time when the steering wheel p is in the neutral posture, thereby enabling the serration-fitting of the two. Here, the phase difference can be limited within the angle of one half pitch of the serrations $1_1$, in either direction from the neutral position of the input shaft 1. Therefore, the maximum angle of rotation of the input shaft 1 from the neutral position is $0.5\alpha$; the deviation of the right and the left steering angles can also be limited within the angle of $0.5\alpha$.

The phase adjustment of the input shaft 1 is performed automatically by inputting the signals from the encoder 13 of the phase measuring device 10 to the control device of the electric motor 36.

After the phase adjustment of the input shaft 1, the input shaft 1 is maintained in the adjusted phase, and a toe adjustment is performed by extending or shortening the tie rods k such that the right and the left wheels are in a straight-running condition.

After this toe adjustment, the suspension assembly A is assembled to the car body and the steering assembly B is subsequently assembled to the car body. Then the socket m is serration-fitted to the input shaft 1.

Thereafter, at a stage when the car is completed, the steering wheel p is assembled to the steering shaft o. This assembly work is performed, after the steering wheel p is temporarily mounted and steered such that the right and the left wheels are in a straight-running condition, by re-mounting the steering wheel p while maintaining it in the neutral posture. Here, when the right and the left wheels are in a straight-running condition, the input shaft 1 is in the same phase as at the time of the toe adjustment. If, at this time, the socket m is in the same phase as at the time of the phase measurement, the serrations os of the steering shaft o are in the same phase as at the phase measurement, i.e., the phase in which the steering wheel p can be serration-fitted to the steering shaft o in the neutral posture. But if the socket m is in a different phase from that at the phase measurement, there are cases where the phase of the serrations os deviates from the above described phase due to the inequality of velocity of the universal joints on both ends of the steering joint n.

Figure 6A:
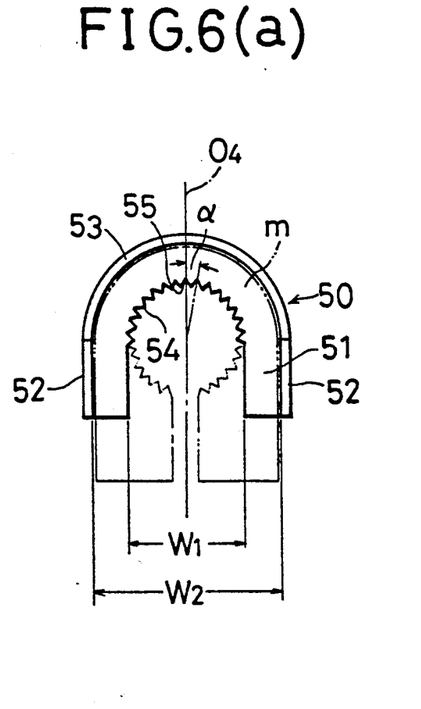
Figure 6B:
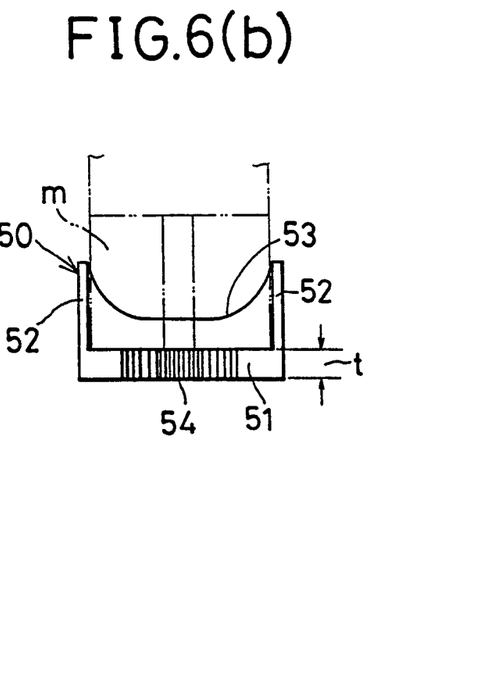
Figure 6C:
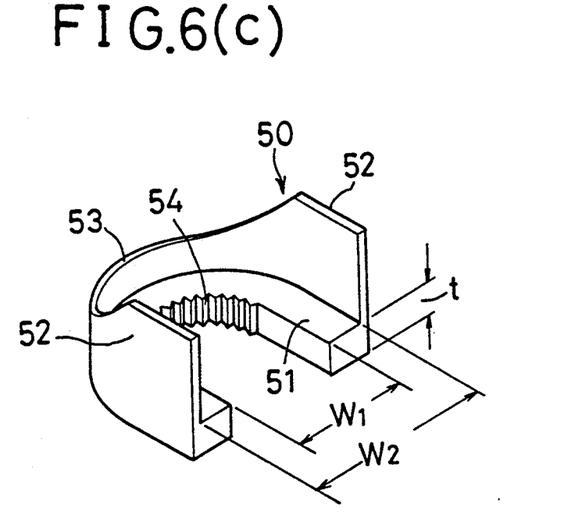

Therefore, a guide member 50 as shown in FIG. 6 is used in order to serration-fit the socket m to the input shaft 1 such that the socket m becomes equal in phase to that at the phase measurement when the input shaft 1 has become the same phase as that at the toe adjustment.

The guide member 50 has a fitting portion 51 of thickness t and a U-shaped guide portion comprising side walls 52, 52 and a semicircular portion 53 which rise from the external periphery of the fitting portion 51. On the internal edge of the fitting portion 51, serrations 54 and an opening of width $w_1$ are provided. The distance between the side walls 52, 52 is $w_2$ which is slightly larger than the width L of the socket m. The guide portion is sized to contain the socket m therein. The serrations 54 are in the same shape as the serrations ms of the socket m and can be fitted to the serrations $1_1$ of the input shaft 1. The thickness t of the fitting portion 51 is slightly smaller than the width of the ring groove $1_2$ of the input shaft 1. The serrations 54 are in such a phase that a tooth land 55 thereof is positioned on the center line $O_4$ of the guide member 50. When the socket m is inserted into the guide member 50, the tooth land $ms_1$ positioned on the center line $O_3$ of the socket m coincides with the tooth land 55 positioned on the center line $O_4$ of the guide member 50, whereby both serrations 54, ms are aligned in the same phase.

Figure 7A:
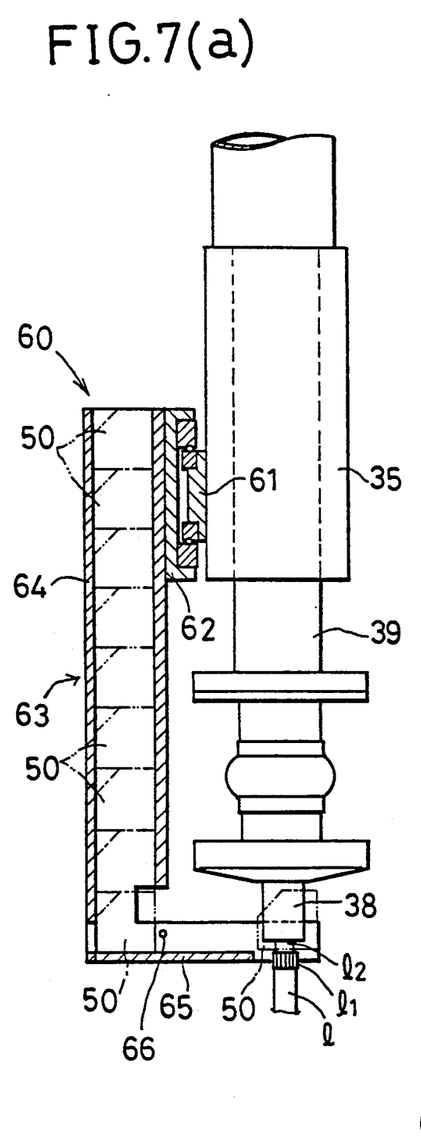
Figure 7B:
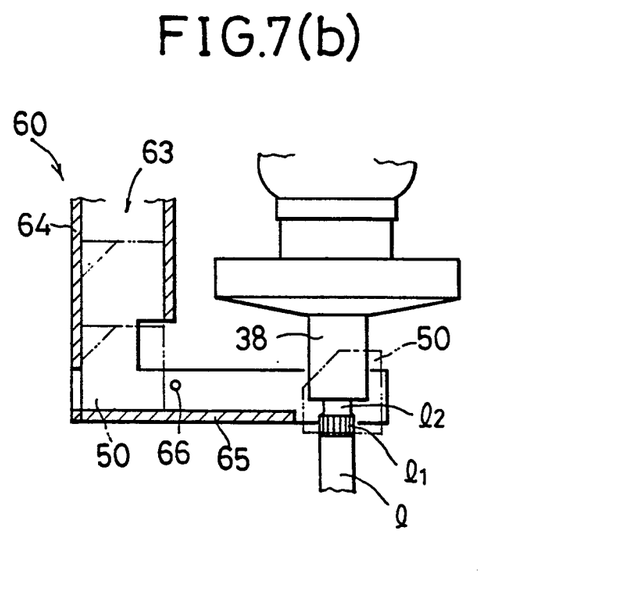
Figure 7C:
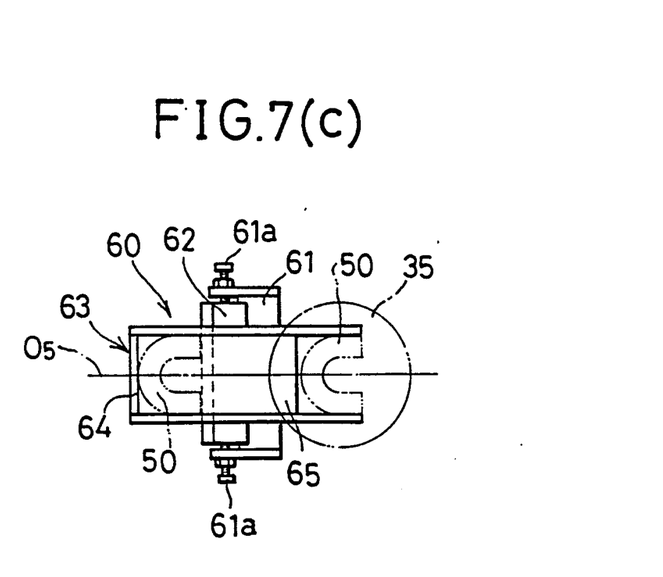

In order to feed the guide members 50 to the input shaft 1, a feeding device 60 as shown in FIGS. 7(a), 7(b), and 7(c) is used. The feeding device 60 has an L-shaped tray 63 which is mounted, via a slider 62, on a bracket 61 to be fixed to the external periphery of the sleeve 35 of the steering positioning device 30. The tray 63 is adjustable in the lateral direction by means of a pair of adjusting screws 61a, 61a which are provided on the bracket 61. The tray 63 comprises a vertical portion 64 and a horizontal portion 65. A resilient stopper 66 having a ball which is resiliently mounted is provided on the horizontal portion 65. A large number of guide members 50 are filled from the upper end into the vertical portion 64. As shown in FIG. 7(a), the lowest guide member 50 is manually pushed to pass by the resilient stopper 66 to the groove $1_2$ of the input shaft 1 and is lowered to fit onto the serrations $1_1$ as shown in FIG. 7(b). The horizontal portion 65 is provided such that it coincides with the reference line corresponding to the reference line $O_2$ of the spindle 18 of the above-described phase measuring device 10, i.e., that reference line $O_5$ which intersects the axis of the input shaft 1 at right angles and is in a vertical plane which includes the axis of the input shaft 1. After having performed the phase adjustment of the input shaft 1 as described above, the guide member 50 which has been pushed out onto the horizontal portion 65 is rotated within an angular range of $\pm 0.5\alpha$ by utilizing the clearance between the side plates of the horizontal portion 65. The guide member 50 is thus serration-fitted to the input shaft 1 in such a phase that, the tooth land 55 positioned on the center line $O_4$ coincides, among the tooth crests of the serrations $1_1$, with that tooth crest closest to the reference line $O_5$. Here, since the phase measurement of the socket m is performed, as described above, such that the angle of deviation of the tooth land $ms_1$ on the center line $O_3$ off the reference line $O_2$ is limited within a range of $\pm 0.5\alpha$, that tooth crest of the serrations $1_1$ that is closest to the reference line $O_5$ corresponds to that tooth crest on the center line of the guide 19 of the spindle 18 which coincides with the tooth land $ms_1$ at the time of the phase measurement. This is because the guide member 50 is made to be fitted into the input shaft 1 in the same phase as the one in which the guide 19 is positioned against the spindle 18.

Figure 8A:
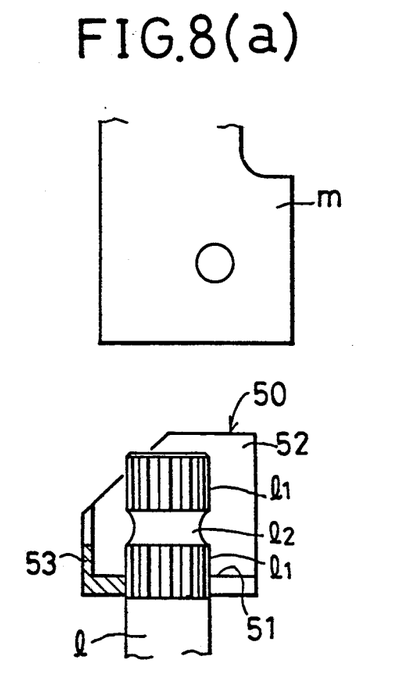

As a result, if the socket m is fitted onto the input shaft 1 guided by the guide member 50 from the condition as shown in FIG. 8(a), the socket m is made to be serration-fitted to the input shaft 1 in the same phase as the one in which the socket m is fitted to the spindle 18. When the input shaft 1 is made to be in the same phase, with the right and the left wheels in a condition of straight running, as the phase at the time of toe adjustment, the socket m becomes the same phase as the one at the time of the phase measurement. The steering wheel p can, therefore, be accurately serration-fitted to the steering shaft o in the neutral posture, as described above.

Figure 8B:
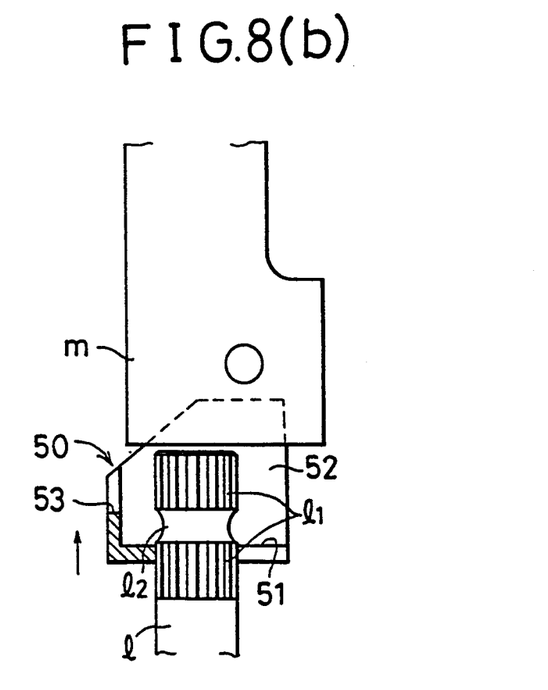
Figure 8C:
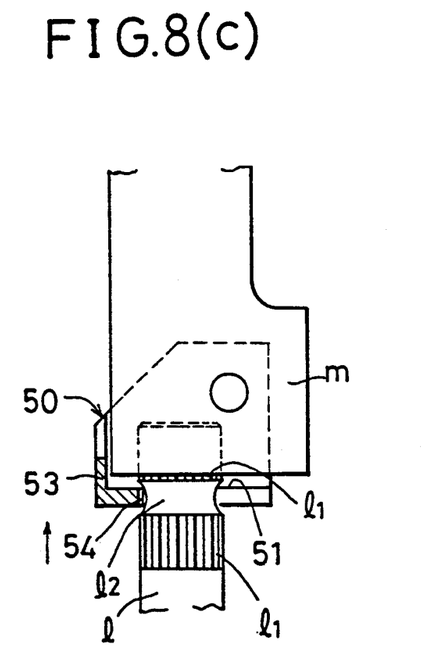
Figure 8D:
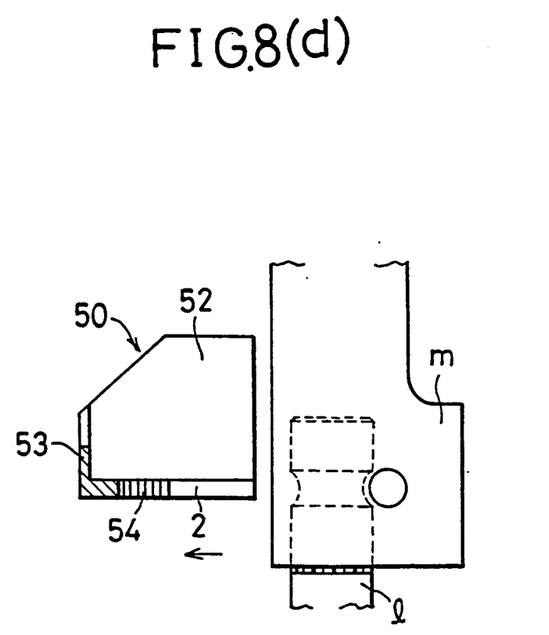

In fitting the socket m, the socket m is guided, as shown in FIG. 8(b), with the guide member 50 being slightly pushed upwards. After having fitted the socket m down as far as the upper portion of the ring groove $1_2$, the guide member 50 is pushed upwards, as shown in FIG. 8(c), until the fitting portion 51 coincides with the ring groove $1_2$, thereby releasing the engagement of the serrations 54 with the serrations $1_1$ at the lower portion of the ring groove $1_2$. After the guide member 50 has been withdrawn from the input shaft 1 in the direction as shown by an arrow in FIG. 8(d), the socket m is further lowered to completely fit it onto the input shaft 1. The removed guide member 50 is then returned to the feeding device 60 for repeated use.

As described above, by employing the guide member 50, the socket m can be fitted in the input shaft 1 without giving rise to a phase deviation within a restricted working space in the engine compartment.

The guide portion of this guide member 50 can be slightly inclined at the upper part of the semicircular portion 53. The upper part may be made to have an equal height as the side walls 52 or the upper part of the side walls 52 and the semicircular portion 53 may be formed as shown in FIGS. 6(b) and 6(c) in an upwardly-opened shape to serve as a guide.

A large number of the steering wheels p are kept in stock in a steering wheel assembly station and they are respectively assembled in succession to the steering assembly of each car. Whichever steering wheel may be used, the phase of the serrations formed in the boss bore is the same as that of the serrations of the boss bore of the steering wheel that has been used in the phase measurement of the socket m. Therefore, the steering wheel can be assembled in the neutral posture in a straight-running condition.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of assembling a steering assembly having a socket connected to a steering shaft via a steering joint which socket is to be serration-fitted to an input shaft of a gearbox mounted on a suspension assembly having wheels, said method comprising the steps of:

measuring a phase of the socket of the steering assembly at the time when a steering wheel is aligned in a neutral posture while the steering assembly is maintained in an articulated condition similar to that in which the steering assembly is assembled to a car body and while the steering wheel is removably serration-fitted to the steering shaft of the steering assembly;

adjusting a phase of the input shaft such that the input shaft can be serration-fitted into the socket which is in the phase measured in the preceding step, the step of input shaft phase measured in the preceding step, the step of input shaft phase adjustment including a step of rotating the input shaft within an angular range corresponding to one half pitch of the serrations of the input shaft in either direction from a neutral position in which the steering angles to the right and to the left are equal;

adjusting the alignment of the right and the left wheels to a condition in which the car can run straight, while the input shaft is maintained in said adjusted phase;

engaging a guide member which determines the phase of the socket relative to the input shaft;

assembling the suspension assembly and the steering assembly with the steering wheel detached therefrom to the car body; and serration-fitting, with the guide member, the socket of the steering assembly to the input shaft of the suspension assembly by guiding the socket with the guide member such that the phase of the socket becomes substantially equal to said measured phase when the input shaft is in said adjusted phase.

2. A method of assembling a steering assembly having a socket connected to a steering shaft via a steering joint which socket is to be serration-fitted to an input shaft of a gearbox which is mounted on a suspension assembly having wheels, the method comprising the steps of:

forming serrations in a boss bore of each steering wheel which is to be serration-fitted to the steering shaft of the steering assembly, by controlling a phase thereof to become a predetermined phase;

measuring a phase of the socket of the steering assembly at the time when a steering wheel member comprising one of the steering wheel and a steering wheel model is aligned in a neutral posture while the steering assembly is maintained in an articulated condition similar to that in which the steering assembly is assembled to a car body and while the steering wheel is serration-fitted to the steering shaft of the steering assembly, the steering wheel model having a boss bore formed therein with serrations of the same phase as that of the serrations of the boss bore of the steering wheel;

adjusting a phase of the input shaft such that the input shaft can be serration-fitted into the socket which is in said phase measured in the preceding step, the step of input shaft phase adjustment including a step of rotating the input shaft within an angular range corresponding to one half pitch of the serrations of the input shaft in either direction from a neutral position in which the steering angles to the right and to the left are equal;

adjusting the alignment of the right and the left wheels to a condition in which the car can run straight, while the input shaft is maintained in said adjusted phase;

engaging a guide member which determines the phase of the socket relative to the input shaft;

assembling the suspension assembly and the steering assembly with the steering wheel detached therefrom to the car body; and serration-fitting, with the guide member, the socket of the steering assembly to the input shaft of the suspension assembly by guiding the socket with the guide member such that the phase of the socket becomes substantially equal to said measured phase when the input shaft is in said adjusted phase.

* * * * *

UNITED STATES PATENT AND TRADEMARK OFFICE
CERTIFICATE OF CORRECTION

PATENT NO. : 5,063,650

DATED : November 12, 1991

INVENTOR(S) : Kenji NEMOTO et al

It is certified that error appears in the above-identified patent and that said Letters Patent is hereby corrected as shown below:

Column 9, line 55, delete "measured in the preceding";
line 56, delete "step, the step of input shaft phase".

Signed and Sealed this

Twenty-second Day of June, 1993

Attest:

MICHAEL K. KIRK

Attesting Officer

Acting Commissioner of Patents and Trademarks